(12) United States Patent
Rohr et al.

(10) Patent No.: US 12,498,408 B2
(45) Date of Patent: Dec. 16, 2025

(54) DETERMINING PARAMETERS OF A FILTER CIRCUIT

(71) Applicant: ABB Schweiz AG, Baden (CH)

(72) Inventors: Eduardo Rohr, Camberwell (AU); Marc Ribò Roca, Zürich (CH)

(73) Assignee: ABB Schweiz AG, Baden (CH)

( * ) Notice: Subject to any disclaimer, the term of this patent is extended or adjusted under 35 U.S.C. 154(b) by 186 days.

(21) Appl. No.: 18/269,548

(22) PCT Filed: Dec. 17, 2021

(86) PCT No.: PCT/EP2021/086383
§ 371 (c)(1),
(2) Date: Jun. 23, 2023

(87) PCT Pub. No.: WO2022/136141
PCT Pub. Date: Jun. 30, 2022

(65) Prior Publication Data
US 2024/0069085 A1    Feb. 29, 2024

(30) Foreign Application Priority Data

Dec. 23, 2020   (EP) ..................................... 20217056

(51) Int. Cl.
*G01R 31/12*      (2020.01)
*G01R 31/01*      (2020.01)
(Continued)

(52) U.S. Cl.
CPC .......... *G01R 31/016* (2013.01); *H02M 1/126* (2013.01); *H02M 7/487* (2013.01); *H02M 7/521* (2013.01)

(58) Field of Classification Search
CPC ...... G01R 31/016; G01R 31/42; G01R 31/64; H02M 7/5387; H02M 7/521; H02M 7/487; H02M 1/126
See application file for complete search history.

(56) References Cited

U.S. PATENT DOCUMENTS 7,154,277 B2   12/2006  Vallinmaki
10,564,210 B2*  2/2020  Yoshida ................. G01R 31/64
(Continued)

FOREIGN PATENT DOCUMENTS

CN        102307004 B     1/2012
EP         3096429 A1    11/2016
(Continued)

OTHER PUBLICATIONS

European Office Action for Application No. 20217056.9, dated Nov. 15, 2024, 11 pages.
(Continued)

*Primary Examiner* — Thang X Le
(74) *Attorney, Agent, or Firm* — McCarter & English, LLP; Mchael M. Gnibus; Sean J. Varley

(57) ABSTRACT

A converter device is provided. The converter device includes a filter circuit, a DC link and an active rectifier interconnected between the filter circuit and the DC link. A method for determining at least one parameter (b) of the filter circuit is also provided. The method includes switching the active rectifier into an active state, where a first active rectifier leg connects a first phase of the filter circuit with a positive side of the DC link and a second active rectifier leg connects a second phase of the filter circuit with a negative side of the DC link; determining a time series (y) of current values by measuring a current through the filter circuit; and determining the at least one parameter (b) of the filter circuit by calculating a best fit of the at least one parameter (b) from a difference equation of the filter circuit.

15 Claims, 4 Drawing Sheets

(51) Int. Cl.
  *H02M 1/12* (2006.01)
  *H02M 7/487* (2007.01)
  *H02M 7/521* (2006.01)

(56) References Cited

U.S. PATENT DOCUMENTS

| | | | | |
|---|---|---|---|---|
| 2007/0030707 | A1* | 2/2007 | Wei | H02M 5/4585 |
| | | | | 363/44 |
| 2015/0123579 | A1* | 5/2015 | Liu | H02P 21/06 |
| | | | | 318/400.05 |
| 2017/0141712 | A1* | 5/2017 | Royak | H02P 6/08 |
| 2019/0195962 | A1* | 6/2019 | Mustonen | G01R 31/42 |
| 2021/0270913 | A1* | 9/2021 | Benesch | H02H 9/005 |

FOREIGN PATENT DOCUMENTS

| | | |
|---|---|---|
| EP | 3232217 A1 | 10/2017 |
| EP | 3637115 A1 | 4/2020 |

OTHER PUBLICATIONS

Pirsto, Ville, et al. "Real-time identification of LCL filters employed with grid converters." IEEE Transactions on Industry Applications 56.5 (2020): 5158-5169.

Ren, Lei, and Chunying Gong. "Modified hybrid model of boost converters for parameter identification of passive components." IET Power Electronics 11.4 (2018): 764-771.

Written Opinion for International Application No. PCT/EP2021/086383, dated Jul. 4, 2022, 9 pages.

* cited by examiner

DETERMINING PARAMETERS OF A FILTER CIRCUIT

CROSS REFERENCE TO RELATED APPLICATIONS

This patent application is a National Stage Entry of PCT/EP2021/086383 filed on Dec. 17, 2021, which claims the benefit and priority of EP application 20217056.9 filed on Dec. 23, 2020, the disclosures of which are incorporated by reference herein in their entirety as part of the present application.

BACKGROUND

The present disclosure relates to the field of power electronic devices. In particular, the present disclosure relates to a method, a computer program, a computer-readable medium and a controller for determining at least one parameter of a filter circuit of a converter device. Furthermore, the present disclosure relates to a converter device.

The knowledge of the state of health of components of a converter device is a critical piece of information for the safe and reliable operation of these devices. In particular, the health state of capacitors is usually particularly important for two main reasons: capacitors are prone to deteriorate over time, and due to the potentially large amounts of energy stored in a capacitor, a failure could result in a rapid uncontrolled release of energy, causing potential damages.

Usually, specialized circuitry or at least additional voltage measurement devices are used for determining the state of health of capacitors. Methods for determining the state of health of a capacitor may be based on detecting a resonance frequency, detecting differences in active and/or reactive power between phases, monitoring a DC charge of the capacitor, or estimating the circuit admittances using positive and negative sequence decomposition.

Pirsto, V, Kukkola, J, Rahman, F M M & Hinkkanen, M 2020, 'Real-time identification of LCL filters employed with grid converters', IEEE Transactions on Industry Applications, vol. 56, no. 5, pp. 5158-5169, relates to a system identification technique based on estimating parameters of components used in power converters with a mathematical model.

EP 3 096 429A1 describes a model-based method of estimating physical parameters of a LCL filter connected between a converter and electrical power network and a converter.

EP 3 232 217 A1 describes a main circuit of a mains converter. The inverter includes controllable semiconductor switches and corresponding antiparallel diodes, where two of the semiconductor switches are connected in series with antiparallel switches to form an inverter leg and each inverter leg forms a phase of the inverter. The series connected switch components are connected between a positive voltage bus and a negative voltage bus. An LCL filter is connected to the phases of the inverter and includes inductive components connected at their first ends to the phases of the inverter. The inverter is a three-phase inverter, and each phase is connected to respective filter inductance of the filter. The filter further includes capacitors connected to the second ends of the inductive components and connecting the second ends of the inductive components together. Switching means, which enable to disconnect the filter and thus the inverter from the alternating voltage source, such as voltage grid or a rotating electrical machine, are provided. A filter capacitance of the filter may be determined, where firstly the switching means connect the filter to the voltage grid, then the switching means are opened to disconnect the filter from the voltage grid and the semiconductor switches of the converter bridge are controlled such that the filter capacitors are short-circuited and as such discharged through the inductive components. Two of the lower semiconductor switches are controlled conductive and the filter capacitors are short-circuited through the inductive components of the filter. Then, the capacitors and the inductors of the filter form a resonance circuit and the resonance frequency of the circuit is dictated by the values of the capacitances of the capacitors. A current is measured in the circuit in which the current is flowing, and from the oscillation of the measured current the condition of the capacitors of the filter is determined.

The paper "Modified hybrid model of boost converters for parameter identification of passive components" frp, Ren Lei et al. IET POWER ELECTRONICS, IET, UK, vol. 11, no. 4, 10 Apr. 2018 (2018-04-10), pages 764-771, XP006066965, ISSN: 1755-4535, DOI: 10.1049/IET-PEL.2017.0528 describes a method for a parameter identification of passive components, including capacitors and inductors, of a power electronic converter, in particular a boost converter. For capacitor condition monitoring methods D2 mentions local capacitor model-based methods (LCMMs) and converter parameter model-based methods (CPMMs) and proposes a hybrid-model of LCMM and CPMM.

EP 3 637 115 A1 describes a method and an apparatus for detecting a capacitance of a filter capacitor of an inverter. For carrying out the method for detecting capacitance of a filter capacitor of the inverter, each output terminal of the inverter is connected to one terminal of a first filter capacitor through an inductor, and the other terminals of all first filter capacitors are interconnected. The inverter controls a voltage output by one output terminal of the inverter to be always zero, controls other output terminals of the inverter to sequentially output a first voltage, and when one output terminal of the inverter outputs the first voltage, controls voltages output by the other output terminals of the inverter to be zero; the inverter obtains a current of the inductor connected to each output terminal of the inverter when one output terminal of the inverter outputs the first voltage and the voltages output by the other output terminals of the inverter are zero; the inverter determines a ratio of a current of an inductor connected to the output terminal with the output voltage being always zero in the inverter to a current of an inductor connected to each of the other output terminals in the inverter; and the inverter determines, based on the first voltage, the determined ratio, and the current of the inductor connected to the output terminal with the output voltage being always zero, capacitance of a first filter capacitor corresponding to the inductor connected to the output terminal with the output voltage being always zero. So, the inverter of D2 can detect the capacitance of the first filter capacitor of the inverter by controlling a voltage output by the inverter and obtaining the current of the inductor connected to the output terminal of the inverter.

CN 102 307 004 B describes an LCL filtering-based controlled rectifier parameter identification method. The method includes the steps of acquiring short-circuit current; identifying parameters based on genetic algorithm; acquiring an initial phase angle of the grid at startup; real-time estimating of virtual magnetic chain value of the grid under LCL filtering conditions; acquiring an orientation angle of the system under LCL filtering conditions.

BRIEF DESCRIPTION

The present disclosure provides a simple and reliable method for determining parameters, such as a capacitance, of a filter circuit of a converter device without the need for additional hardware.

An aspect of the present disclosure relates to a method for determining at least one parameter of a filter circuit of a converter device. The at least one parameter may include one or more capacitances, one or more inductances and/or one or more resistances of components of the filter circuit. The filter circuit may be a passive filter circuit and/or may have at least two phases. For example, the filter circuit may have three phases. The filter circuit may be composed of capacitors, inductors and/or resistors.

The converter device includes the filter circuit, a DC link and an inverter interconnected between the filter circuit and the DC link. As the filter circuit, the converter device may include at least two phases. For example, the converter device may include three phases. The DC link may be a simple or split DC link. The inverter may include an inverter leg for each of the phases of the converter device. The inverter leg may be a half-bridge, a neutral point clamped, full H-bridge, or other inverter leg topology.

As described below, the inverter is used for generating a current through the filter circuit. The current is measured and therefrom the at least one parameter is determined by evaluating a transfer function of the filter circuit.

According to an embodiment of the present disclosure, the method includes: switching the inverter into an active state, in which a first inverter leg of the inverter connects a first phase of the filter circuit with a positive side of the DC link and a second inverter leg of the inverter connects a second phase of the filter circuit with a negative side of the DC link. A current may be induced in the filter circuit in this way.

In the case of a three-phase converter device, it may be that a third inverter leg of the inverter is switched, such that the corresponding phase of the filter circuit is disconnected from the DC link or is connected to a neutral point of converter device. The active state may be written [1, −1, 0] in the case of the third inverter leg connecting to the neutral point or [1, −1, NC] in the case of the third inverter leg disconnecting from the DC link.

According to an embodiment of the present disclosure, the method includes: after switching into an active state, switching the inverter into a zero state, in which two or more inverter legs of the inverter connects two or more phases of the filter circuit to the same voltage potential of the DC link. For example, the zero state may be achieved by applying a zero vector to the inverter, which may be of the form [0, 0, X], in which the third phase may or may not be connected (X=0 or X=NC).

According to an embodiment of the present disclosure, the method further includes: determining a time series of current values by measuring a current through the filter circuit at a plurality of consecutive time steps. During the measurement, the inverter is in the zero state. The measurements indicate a dynamical behaviour of the components of the filter circuit, which are interconnected with the DC link. The current values may be determined at equally spaced time steps. The measurements may be made with a current sensor, which is interconnected between the filter circuit and the inverter, i.e. a current sensor, which is adapted for measuring an inverter current.

In general, the inverter may include an inverter leg for each phase, the inverter leg including a midpoint connected to a phase of the filter circuit and end points connected to the DC link. The inverter leg may be a simple two-level inverter leg or a three-level inverter leg such as a neutral point clamped inverter leg.

According to an embodiment of the present disclosure, the method further includes: determining the at least one parameter of the filter circuit by calculating a best fit of the at least one parameter from a difference equation of the filter circuit into which the time series of current values is input, where the difference equation is a function of current values at different time steps and of the at least one parameter. The difference equation may be derived from a discretized transfer function of the filter circuit. In the active state, a small perturbation may be induced in the inverter currents and the resulting capacitor currents through the filter circuit may be analysed. The method relies on the time series response to an initial perturbation of the filter circuit. The resulting time series of current values is then analyzed, for example using a least-squares error technique, to determine the one or more parameters that best fit the observed measurements.

For the components of the filter circuit, which are interconnected in the active state of the inverter, a transfer function may be determined, which, in a discretized way, describes a dynamical behaviour of the components of the filter circuit. The transfer function may be seen as a model of the filter circuit or at least the components of the filter circuit, which are interconnected with the DC link in the active state. It also may be that a model of a simplified filter circuit is used, for example where some passive components, for example such as small resistances, are neglected.

The transfer function may be discretized with respect to the time steps, at which the time series of current values is measured. Since the transfer function response may solely depend on the current value at an actual time step n, and one or more previous times steps n−1, n−2, . . . , and the at least one parameter, a best fit for the at least one parameter can be determined. This may be done by minimizing a least mean square error. Note that the at least one parameter may be time independent.

In the end, with the method, the at least one parameter is determined, which may be used for monitoring the at least one parameter over time, for example, for monitoring a degrading of component of the filter circuit, and/or for generating an error or warning message, when the at least one parameters deviates from a given nominal parameter value.

Above methods have been described with respect to two phases of the filter circuit. It may be that the method is repeated for other pairs of phases. In this way, further parameters of the filter circuit can be determined. The active state for these other pairs of phases may be written as [1, NC, −1] (or [1, 0, −1]) and as [NC, 1, −1] (or [0, 1, −1]).

With the method, existing semiconductors of the inverter and current measurement devices are used, therefore no additional hardware is required. No installation of any additional hardware or measurement devices is necessary. Current measurements may be taken from an existing inverter current sensor.

According to an embodiment of the present disclosure, the difference equation equates a current value at a time step n with current values at previous times steps n−1, n−2, . . . multiplied with one or more parameters of the filter circuit.

The difference equation may be derived from a continuous transfer function, which may be based on a possibly simplified model of the filter circuit. Furthermore, it may be assumed that the inverter voltage is zero, since the inverter stays in the zero state during the measurements.

According to an embodiment of the present disclosure, the difference equation is of the form g+hb=0, where in general g is a vector and h is a matrix, with elements formed of linear combinations of current values of the time series at different and/or past time points. In general, b is a vector formed of the at least one parameter. In the case of a single parameter to be determined, b may be a scalar value.

According to an embodiment of the present disclosure, the best fit b for the at least one parameter is determined by $(h^T h)^{-1} h^T g$.

In a special case, when b is a scalar, g and h may be vectors composed of the entries $g_n = y[n] + y[n-2]$, $h_n = y[n-1]$ and y[n] is the current value at the time step n. However, also other statistical techniques for determining a best fit may be used. The least mean square determination may have the advantage that the at least one parameter can be determined recursively by adding further summands to $h^T g$ and $h^T h$, when a further measurement value y[n] is determined. The individual measurement values do not need to be stored.

According to an embodiment of the present disclosure, the at least one parameter includes a capacitance of a capacitor of the filter circuit. The method may be used for determining a main capacitance of a filter circuit, which may be an Input Filter Unit (IFU) of the converter device, used in conjunction with an inverter, which may be an Active Front End (AFE) of the converter device. The purpose may be to determine whether the main capacitor is in a healthy condition and therefore it is safe to operate the converter device.

According to an embodiment of the present disclosure, the method further includes: before switching in the active state, switching the inverter into a zero state in which the first phase and the second phase of the filter circuit, for which the at least one parameter is determined, are at least one of disconnected or connected to the same potential. In this way, the filter circuit and the inverter may be brought into a defined stationary state, where no current or nearly no current is flowing. The zero state for the first two phases may be implemented as [NC, NC, NC] or [1, 1, 1] or [0, 0, 0] or [−1, −1, −1], where NC is not connected, 1 is connected to a positive side of the DC link, 0 is connected to a neutral-point, and −1 is connected to a negative side of the DC link.

According to an embodiment of the present disclosure, the method further includes: before switching in the active state, charging the DC link. The DC link may be charged before optionally switching in the zero state and after that in the active state. This may be done with an additional charger of the converter device. The DC link may be charged to a different level as used in regular operation.

According to an embodiment of the present disclosure, the method further includes: before switching in the active state, open a circuit breaker between an electrical grid supplying the converter device and the filter circuit. The method may be performed, when an electrical grid is disconnected from the filter circuit, for example, when a circuit breaker between the electrical grid and the filter circuit is open. The opening of the circuit breaker may have been done a comparable long time before, for example after the shutdown of the converter device. It may be that the circuit breaker only is closed, when the determination of the at least one parameter shows that the filter circuit is healthy. The method may be run automatically before closing the circuit breaker.

According to an embodiment of the present disclosure, the filter circuit, for each phase, includes an inductor connected into the phase and a capacitor connecting a phase to a common point or interconnecting two phases with each other. The capacitors may be star-connected or delta-connected.

According to an embodiment of the present disclosure, the method further includes: determining the at least one parameter regularly. For example, the at least one parameter may be determined automatically, when the converter device is started.

According to an embodiment of the present disclosure, the method further includes: storing the at least one parameter every time it is determined, thus producing a history of the at least one parameter indicative of a degrading of components of the filter circuit. The at least one parameter may be stored together with the time in a memory of a controller of the converter device. For example, when the at least one parameter includes a capacitance of a capacitor of the filter circuit, this parameter may decay over time and from this, a time in the future may be determined, when the capacitor has to be exchanged.

According to an embodiment of the present disclosure, the method further includes: predicting a lifetime of a component of the filter circuit from the history of the at least one parameter. The history of the at least one parameter may be extrapolated into the future.

When the at least one parameter exceeds a threshold in the future, then this may indicate the end of the lifetime. In general, the history may be used to monitor a parameter degradation over time. The degradation over time may be used to predict component lifetime and/or to issue warnings.

According to an embodiment of the present disclosure, the method further includes: determining the at least one parameter automatically before a circuit breaker of the converter device is closed. As already mentioned, the method may be automatically performed at start-up of the converter device for testing whether the filter circuit is healthy. It has to be noted that the method can be performed with the circuit breaker open and therefore is especially suited for such a test.

According to an embodiment of the present disclosure, the method further includes: outputting a warning message, when the at least one parameter exceeds a threshold. The warning may indicate that maintenance has to be done soon.

According to an embodiment of the present disclosure, the method further includes: preventing operation of the converter device, when the at least one parameter exceeds a threshold. It also may be that the method is used for automatically stopping the start-up of the converter device, when the at least one parameter indicates that the filter circuit is not healthy.

A further aspect of the present disclosure relates to a computer program including instructions which, when being executed by a processor, cause the processor to carry out the method as described herein. Such a computer program may be stored in a memory of the controller of the converter device and/or may run in a processor of the converter device.

A further aspect of the present disclosure relates to a computer-readable medium in which such a computer program is stored. A computer-readable medium may be a hard disk, an USB (Universal Serial Bus) storage device, a RAM (Random Access Memory), a ROM (Read Only Memory), an EPROM (Erasable Programmable Read Only Memory)

or a FLASH memory. A computer-readable medium may also be a data communication network, e.g. the Internet, which allows downloading a program code. In general, the computer-readable medium may be a non-transitory or transitory medium. For example, the memory of a controller of the converter device may be such a computer-readable medium.

A further aspect of the present disclosure relates to a controller for a converter device adapted for performing the method as described herein. It may be that the method is at least partially implemented in hardware, such as in an FPGA.

In general, the controller may be adapted for controlling states of the semiconductor switches of the inverter and optionally the further converter, analysing the resulting inverter and/or filter currents, and for determining the at least one parameter of the filter circuit based on a best fit approach. This may mean that one or more parameters are found that minimize a least square error of the equation that describes the expected circuit current, i.e. the difference equation.

A further aspect of the present disclosure relates to a converter device, which includes a filter circuit, an inverter connected to the filter circuit, a DC link supplied by the inverter, and a controller adapted for performing the method as described herein.

The controller also may be adapted for controlling the inverter to convert an AC current from the filter circuit into a DC current to be supplied to the DC link. The inverter may be controlled as an active rectifier.

The converter device may further include one or more further inverters connected to the DC link for supplying one or more electrical machines. The controller may be adapted also for controlling this further converter to convert a DC current from the DC link into an AC current to be supplied to the one or more electrical machines. Alternatively or additionally, the one or more further inverters may be connected to other electrical systems, such as microgrids, grids with different frequencies, electrical loads, or a combination of these.

The converter device may further include a transformer, for transforming a voltage from an electrical grid into a voltage of different amplitude to be supplied to the electrical filter. The transformer may be interconnected between the electrical grid and the filter circuit. The transformer may also have the same voltage on the primary and secondary windings.

The converter device may further include a DC link charger for charging the DC link. The controller may be adapted for controlling the DC link charger for charging the DC link from a further power source, such as a further transformer connected to the electrical grid.

The converter device may further include a circuit breaker, which may be interconnected between the electrical grid and the filter circuit. Also the circuit breaker may be controlled by the controller.

The converter device may further include a current measurement device, which may be adapted for sensing an inverter current and/or a current between the filter circuit and the inverter device.

It has to be understood that features of the method as described in the above and in the following may be features of the computer program, the computer-readable medium, the controller, and the converter device as described in the above and in the following, and vice versa.

These and other aspects of the present disclosure will be apparent from and elucidated with reference to the embodiments described hereinafter.

BRIEF DESCRIPTION OF THE DRAWINGS

The present disclosure will be explained in more detail in the following text with reference to exemplary embodiments which are illustrated in the attached drawings.

In principle, identical parts are provided with the same reference symbols in the figures.

DETAILED DESCRIPTION

Figure 1:
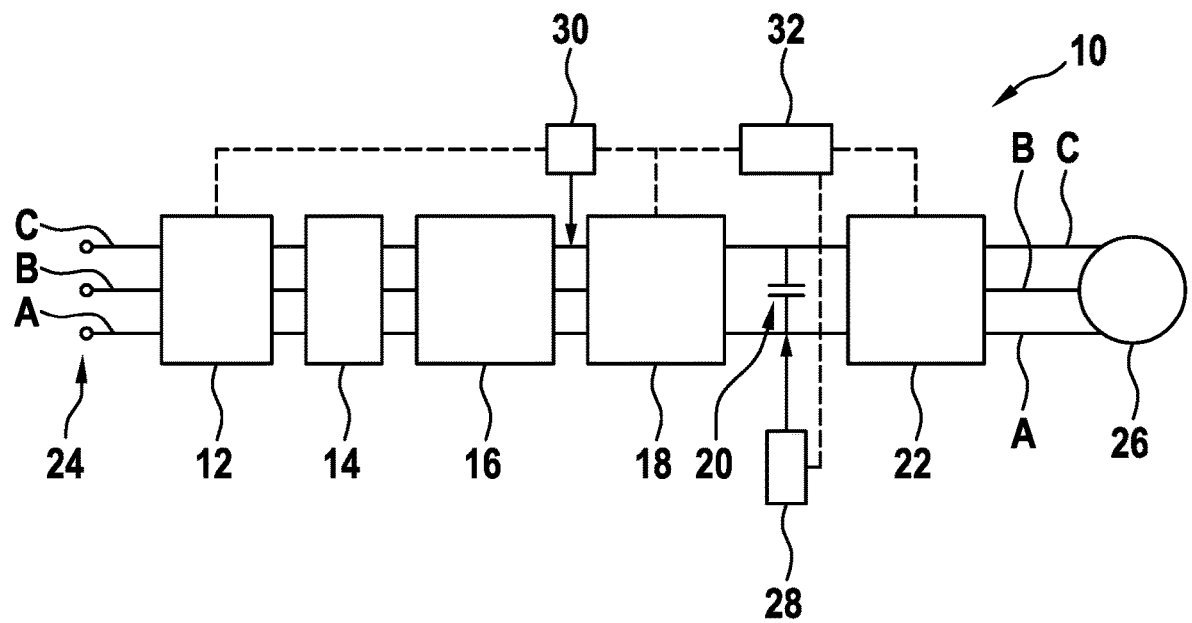
FIG. 1 shows a schematic diagram of a converter device according to an embodiment of the present disclosure.

FIG. 1 shows a converter device 10, which includes a circuit breaker 12, a transformer 14, a filter circuit 16, an inverter or active rectifier 18, a DC link 20, and a further inverter 22. The transformer 14 is supplied by an electrical grid 24 by an AC current. The further inverter 22 supplies an electrical machine 26 with a further AC current of different voltage and frequency. The components 12, 14, 16, 18, 20, 22 are cascade connected. The converter device 10 has three phases A, B, C.

The converter device 10 also includes a DC link charger 28 for charging the DC link 20 and in particular its one or more capacitors. The DC link charger 28 may be supplied via a further transformer connected to the grid 24.

A current sensor 30 is configured for sensing an inverter current between the filter circuit 16 and the inverter 18.

Furthermore, a controller 32 of the converter device 10 is configured for controlling the active components 12, 18, 22, 28.

During a normal operation, the circuit breaker 12 is closed, the inverter 18 is controlled to convert an AC current from the filter circuit 16 into a DC current to be supplied to the DC link 20 and the further inverter 22 is controlled to convert the DC current from the DC link 20 into an AC current to be supplied to the electrical machine 26.

During a shut-down operation, the inverters 18 and 22 are stopped and the circuit breaker 12 is opened.

During a start-up operation, the DC link 20 is charged with the charger 28, the state of healthiness of the filter circuit 16 is determined as described above and below. If the filter circuit 16 is healthy, the circuit breaker 12 is closed and normal operation is started.

Figure 2:
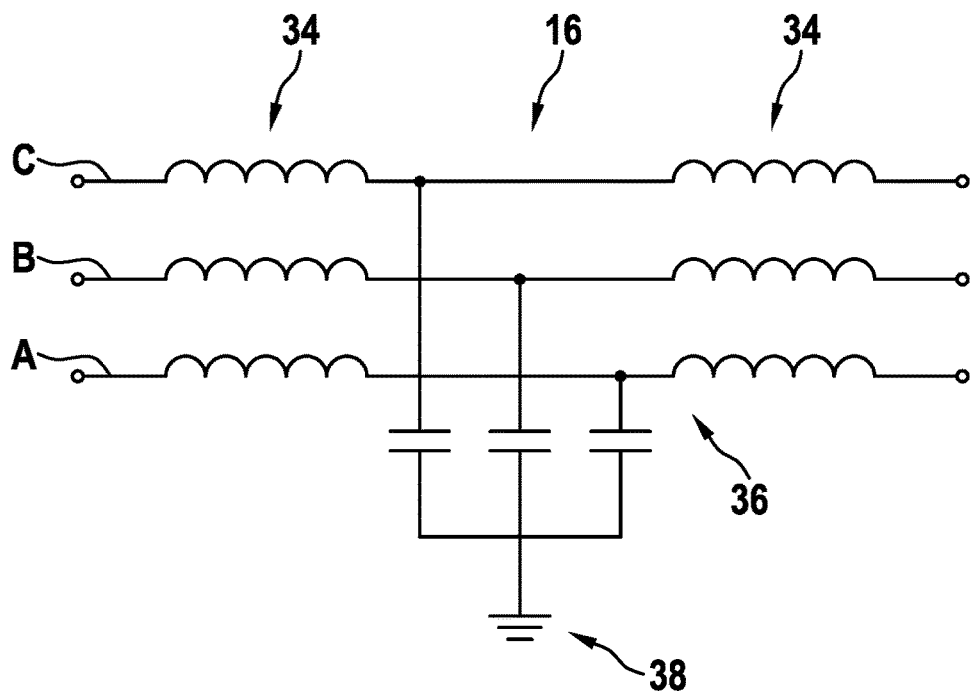
FIG. 2 shows a schematic circuit diagram of a filter circuit of a converter device according to an embodiment of the present disclosure.

FIG. 2 shows an embodiment of a filter circuit 16. One or more inductors 34 are interconnected in each phase A, B, C. Every phase A, B, C is connected via a capacitor 36 with a common point 38. This point may be floating, or connected directly or through a network of passive components to an earth or to a neutral point.

Figure 3:
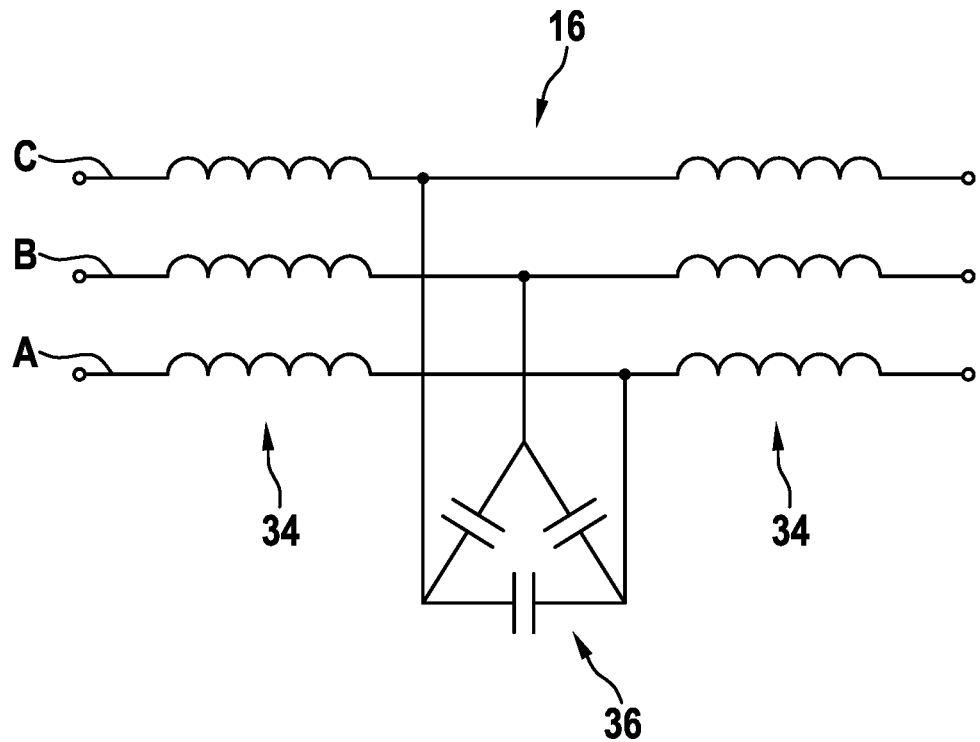
FIG. 3 shows a schematic circuit diagram of a filter circuit of a converter device according to a further embodiment of the present disclosure.

FIG. 3 shows a further embodiment of a filter circuit 16. Contrary to FIG. 2, each pair of phase A, B, C is interconnected via a capacitor 36, which are therefore delta-connected.

Figure 4:
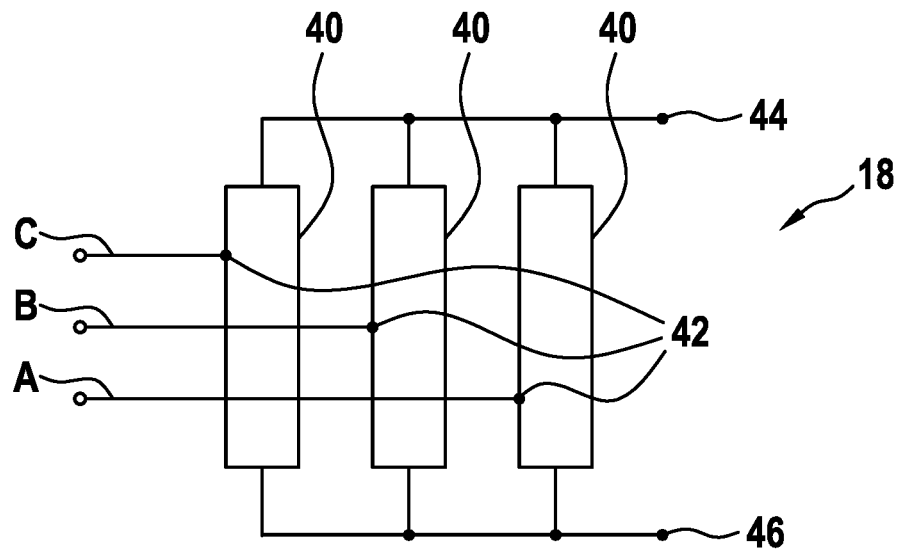
FIG. 4 shows a schematic circuit diagram of an inverter of a converter device according to a further embodiment of the present disclosure.

FIG. 4 shows an embodiment of an inverter 18. The inverter 18 includes three inverter legs 40, each of which has a midpoint 42, which is connected to one of the phases A, B, C. Outer ends of the inverter legs 40 are connected to a positive side 44 and a negative side 46 of the DC link 20.

Figure 5:
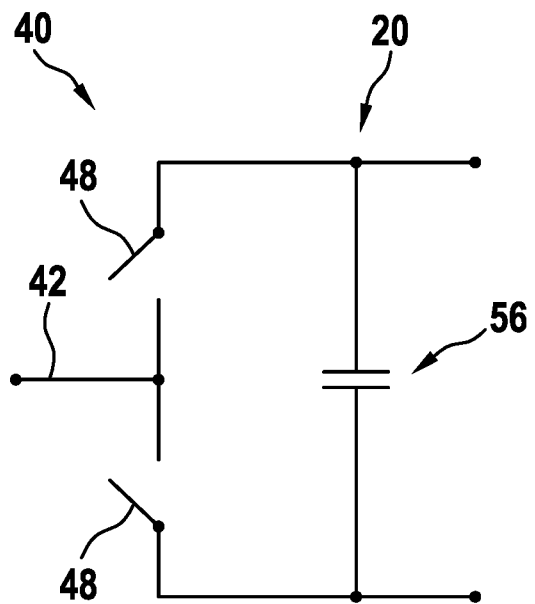
FIG. 5 shows a schematic circuit diagram of an inverter leg of a converter device according to an embodiment of the present disclosure.

FIG. 5 shows a two-level inverter leg 40 in the form of a half-bridge, which includes two semiconductor switches 48 connected in series between the two sides 44, 46 of the DC link 20 and providing the midpoint 42 in between them.

Figure 6:
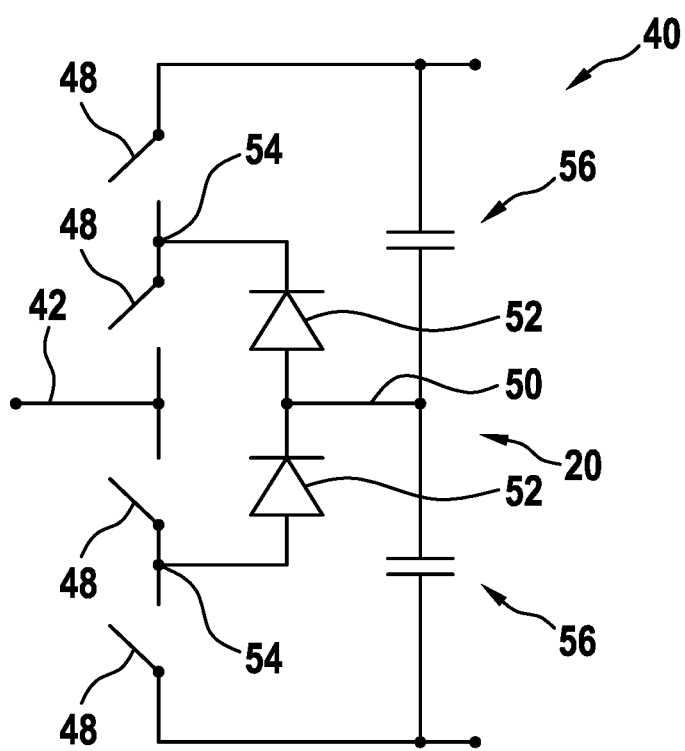
FIG. 6 shows a schematic circuit diagram of an inverter leg of a converter device according to a further embodiment of the present disclosure.

FIG. 6 shows a three-level inverter leg 40 in the form of neutral point clamped H-bridge, which includes four semiconductor switches 48 connected in series between the two sides 44, 46 of the DC link 20. The midpoint 42 is provided between the two inner switches 48. A neutral point 50 is connected via two diodes 52 with intermediate points 54 between an outer and an inner switch 48. The neutral point 50 is connected to a middle point of a split DC link 20, which includes two series connected capacitors 56.

Contrary to this, the DC link 20 of FIG. 5 includes a single capacitor 56 connected to the sides 44, 46.

Figure 7:
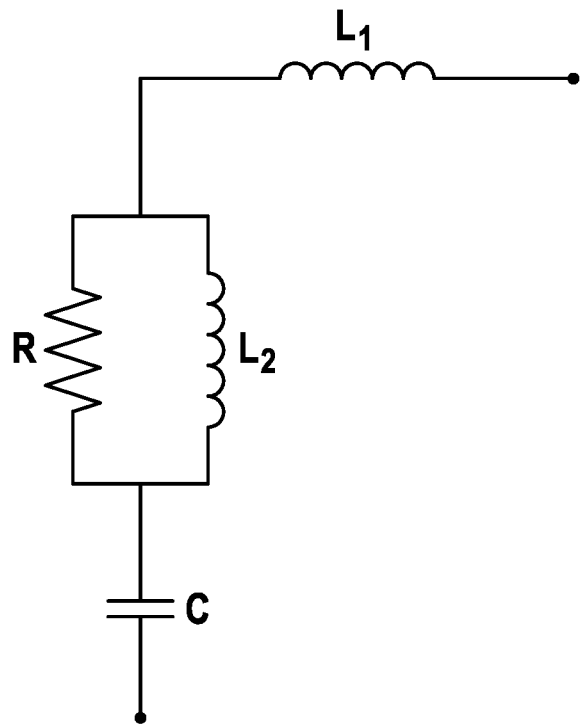
FIG. 7 shows an equivalent circuit for a filter circuit of a converter device according to a further embodiment of the present disclosure.

FIG. 7 shows an equivalent circuit of one of the phases of the filter circuit 16 as shown in FIG. 2, which is used for describing how a discretised transfer function can be derived for the filter circuit 16. In general, such a discretised transfer function also can be derived for the filter circuit 16 shown in FIG. 3 or any other passive filter circuit.

The equivalent diagram of FIG. 7 refers to the part of the filter circuit 16, which is connected in a specific active state of the inverter 18 to the DC link 20, in which one of the phases of the filter circuit 16 is connected to the positive side 44 of the DC link 20 and another one of the phases is connected to the negative side 46 of the DC link.

The transfer function describing the inverter current through the filter circuit 16 as a function of the inverter voltage when the circuit breaker 12 is open is given by:

$$G(s) = \frac{s/L}{s^2 + 1/LC}$$

where $L = L_1 + L_2$ is the sum of the two inductances $L_1$ and $L_2$. Notice that the equivalent resistance R is neglected for this transfer function G(s), but can be included. Transfer functions for other types of filter circuit 16 are also of this form as fractional polynomial in s.

Discretising the transfer function using the bi-linear approximation and sampling time $T_s$ yields:

$$G(z) = \frac{a_0 z^2 + a_1 z + a_2}{z^2 + b_1 z + b_2}$$

with $$a_0 = \frac{T_s}{2L}$$

$$a_1 = 0$$

$$a_2 = -\frac{T_s}{2L}$$

$$b_1 = 2\frac{T_s^2 - 4LC}{T_s^2 + 4LC}$$

$$b_2 = 1$$

The discrete transfer function G(z) can be written as a difference equation describing the inverter current y[n] at time step n, as a function of the inverter voltage u[n]:

$$y[n] = -b_1 y[n-1] - b_2 y[n-2] + a_0 u[n-1] + a_1 u[n-2] + a_2 u[n+2]$$

By waiting two or more sampling times $T_s$ after the inverter voltage u[n] is set to zero, the input terms u[n−1], u[n−2], u[n+2] are zero and can be neglected. Using the definition of $b_2$ from above and rearranging, it follows that $$0 = y[n] + y[n-2] + b_1 y[n-1]$$

Notice that the above is valid for all n. In particular, one can write for N samples:

$$0 = y[n] + y[n-2] + b_1 y[n-1]$$
$$0 = y[n-1] + y[n-3] + b_1 y[n-2]$$
$$0 = y[n-2] + y[n-4] + b_1 y[n-3]$$
$$0 = y[n-3] + y[n-5] + b_1 y[n-4]$$
$$\vdots$$
$$0 = y[n-N+1] + y[n-N-1] + b_1 y[n-N]$$

or in vector form:

$$g + hb_1 = 0$$

In general, i.e. for more general transfer functions, h is a N×P-matrix, $b_1$ is a vector of length P and g is vector of length N. Notice that this set of difference equations is over-determined. The best fit for parameter $b_1$ is given by:

$$b_1 = (h^T h)^{-1} h^T g,$$

Figure 8:
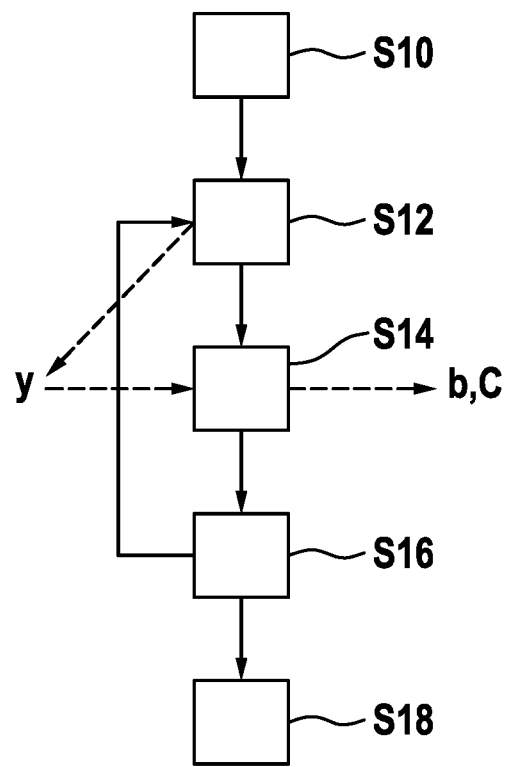
FIG. 8 shows a flow diagram for a method according to a further embodiment of the present disclosure.

FIG. 8 shows a flow diagram for a method that is automatically and/or regularly performed by the controller 32, for example during start-up of the converter device 10.

In step S10 it is ensured that the DC link 20 is charged and that the circuit breaker 12 is open. The DC link 20 may be charged with the charger 28. The circuit breaker 12 may have been opened during the last shut-down of the converter device 10.

In the end of step S10, a zero vector is applied to the inverter 18 to bring combination of the filter circuit 16 and the inverter 18 into a zero state and it is waited for the inverter currents to be small, such as smaller than 1% of the inverter nominal current. The actual inverter currents may be measured with the current sensor 30.

The zero state may be a state in which the phases A, B, C of the filter circuit 16 are connected to the same potential, such as the positive side 44, the negative side 46 or the neutral point 50. A zero vector, which is applied to the inverter, may be indicated as [1, 1, 1], [0, 0, 0], [−1, −1, −1].

In step S12, the inverter 18 is switched into an active state, in which a first inverter leg 40 of the inverter 18 connects a first phase (such as A) of the filter circuit 16 with a positive side 44 of the DC link 20 and a second inverter leg 40 of the inverter 18 connects a second phase (such as B) of the filter circuit 16 with a negative side 46 of the DC link 20.

The switching vector for the phases A and B that are applied by the inverter 18 for achieving the active state may be indicated as [1; −1; 0] or [1, −1, NC].

The switching vector may be applied for 50 μs during which a current flows through the filter circuit and partially charges the filter capacitors.

After that, the inverter 18 is switched into a (possibly second type of) zero state, in which two or more inverter legs 40 of the inverter 18 connect two or more phases of the filter circuit 16 to the same voltage potential of the DC link 20, such as the positive side 44 or the negative side 46 of the DC link 20. For the second type of zero state a second type of zero vector may be applied to the invert 18. The second type of zero vector may be different from the first type of zero vector, which is applied in step S10. For example, the second type of zero vector may be [1, 1, NC], [0, 0, NC], [−1, −1, NC].

When the inverter is in the zero state, a time series y of current values may be generated by measuring a current through the filter circuit 16 at a plurality of consecutive time steps.

The time series y includes measurement values y[n] for the inverter current at time steps n.

In step S14, the measured current data, i.e. the time series y, is evaluated. In particular, at least one parameter b of the filter circuit 16 is determined by calculating a best fit of the at least one parameter b from a difference equation of the filter circuit 16 into which the time series y of current values is input.

As described above, the difference equation is a function of current values y[n] at different time steps n, n−1, . . . and of the at least one parameter b. In particular, a set of difference equations is of the form $$g + hb = 0$$

The difference equation equates a current value y[n] at a time step n with current values y[n], y[n−1], . . . at previous times steps multiplied with parameters b of the filter circuit 16. The parameter b may be provided in vector form, however, also may be a scalar.

g and h are vectors formed of linear combinations of current values of the time series at different time points, such as $$g = \begin{bmatrix} y[n] + y[n-2] \\ y[n-1] + y[n-3] \\ y[n-2] + y[n-4] \\ y[n-3] + y[n-5] \\ \vdots \\ y[n-N] + y[n-N-2] \end{bmatrix} \text{ and } h = \begin{bmatrix} y[n-1] \\ y[n-2] \\ y[n-3] \\ y[n-4] \\ \vdots \\ y[n-1-N] \end{bmatrix}$$

A best fit for the at least one parameter b may be determined by $$b = (h^T h)^{-1} h^T g$$

Notice that the implementation of this equation may be done recursively, without the need to store several measurements y[n] in a buffer.

The capacitance C, for example of a capacitor 36 of the filter circuit 16, can be determined from the parameter b. For example, for the above example, the capacitance C may be retrieved using $$C = \frac{T_s^2}{4L} \frac{2+b}{2-b}$$

In step S16, it may be again waited for current to be small and for repeating the determination for other pairs of phases, such as (B, C) and (A, C). The steps S12 and S14 may be repeated for these pairs. In these steps, the active vector [0; 1; −1] and [−1; 0; 1] (or [NC; 1; −1] and [−1; NC; 1] may be applied to the inverter 18.

In the end, for each pair of phases, an estimation of the average parameters b of the two active phases is provided.

In step S18, a post processing of the parameter(s) b may be performed. With such a post-processing, it can be assured that all phases A, B, C have roughly the same parameters and/or that parameters b are close to what is expected.

For example, a warning message may be output, when the at least one parameter b exceeds a threshold. As a further example, operation of the converter device 10 may be prevented, when the deviation to the expected parameter value of at least one parameter b exceeds a threshold.

It also may be that the at least one parameter b is stored every time it is determined, for example every start-up. In such a way, a history of the at least one parameter b is produced, which history may be indicative of a degrading of components 34, 36 of the filter circuit 16. From such a history, a lifetime of a component 34, 36 of the filter circuit 16 may be predicted.

In summary, the method may be used for assessing the health of capacitors 36 of a filter circuit 16, such as an inverter filter unit. The whole method may take less than one second. A short inverter voltage pulse of about 50 μs may be applied and the resulting inverter current may be used to determine the values C of the capacitors 36. If the identified capacitances C differs too much from nominal capacitances, a warning or a fault may be generated. The proposed method may need very little energy, such as about 5% of the energy stored temporarily in each capacitor 36 of the filter circuit 16 when the inverter is operating in a normal operation mode.

While the present disclosure has been illustrated and described in detail in the drawings and foregoing description, such illustration and description are to be considered illustrative or exemplary and not restrictive; the present disclosure is not limited to the disclosed embodiments. Other variations to the disclosed embodiments can be understood and effected by those skilled in the art and practising the claimed configuration, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for determining at least one parameter (b) of a filter circuit of a converter device, the converter device comprising the filter circuit, a DC link and an active rectifier interconnected between the filter circuit and the DC link, the method comprising:
   switching the active rectifier into an active state, in which a first active rectifier leg of the active rectifier connects a first phase of the filter circuit with a positive side of the DC link and a second active rectifier leg of the active rectifier connects a second phase of the filter circuit with a negative side of the DC link;

after that, switching the active rectifier into a zero state, in which two or more active rectifier legs of the active rectifier connect two or more phases of the filter circuit to the same voltage potential of the DC link;

determining a time series (y) of current values by measuring a current through the filter circuit at a plurality of consecutive time steps; and determining the at least one parameter (b) of the filter circuit by calculating a best fit of the at least one parameter (b) from a difference equation of the filter circuit into which the time series of current values is input, wherein the difference equation is a function of current values at different time steps and of the at least one parameter (b).

2. The method of claim 1,
wherein the difference equation equates a current value at a time step n with current values at previous times steps multiplied with parameters of the filter circuit.

3. The method of claim 1,
wherein the difference equation is of a form $g+hb=0$;
wherein g is a vector and h is a matrix formed of linear combinations of current values of the time series at different time points; and
wherein b is a vector formed of the at least one parameter.

4. The method of claim 1,
wherein the best fit for the at least one parameter is determined by $b=(h^T h)^{-1} h^T g$,
wherein g and h are vectors composed of entries $g_n = y[n]+y[n-2]$, $h_n = y[n-1]$ and $y[n]$ is the current value at the time step n.

5. The method of claim 1,
wherein the at least one parameter (b) comprises a capacitance (C) of a capacitor of the filter circuit.

6. The method of claim 1, further comprising:
before switching in the active state, switching the active rectifier into a zero state in which the first phase and the second phase of the filter circuit, for which the at least one parameter (b) is determined, are at least one of disconnected or connected to the same potential.

7. The method of claim 1, further comprising:
before switching in the active state, charging the DC link; and/or
before switching in the active state, opening a circuit breaker between an electrical grid supplying the converter device and the filter circuit.

8. The method of claim 1,
wherein the first active rectifier leg and the second active rectifier leg are two-level active rectifier legs; or
wherein the first active rectifier leg and the second active rectifier leg are neutral point clamped.

9. The method of claim 1,
wherein the filter circuit, for each phase, comprises an inductor connected into the phase and a capacitor connecting the phase to a common point or interconnecting two phases with each other.

10. The method of claim 1, further comprising:
determining the at least one parameter (b) regularly;
storing the at least one parameter (b) every time it is determined, thus producing a history of the at least one parameter (b) indicative of a degrading of components of the filter circuit; and
predicting a lifetime of a component of the filter circuit from the history of the at least one parameter (b).

11. The method of claim 1, further comprising at least one of:
determining the at least one parameter (b) automatically before a circuit breaker of the converter device is closed;
outputting a warning message, when the at least one parameter (b) exceeds the threshold; or
preventing operation of the converter device, when the at least one parameter (b) exceeds a threshold.

12. A controller for a converter device, the controller comprising a memory and a processor and being adapted for performing the method of claim 1, for controlling states of semiconductor switches of the active rectifier of the converter device, analysing at least one resulting active rectifier or filter currents, and determining the at least one parameter (b) of the filter circuit of the converter device based on a best fit approach.

13. A converter device, comprising:
the controller of claim 12;
the filter circuit;
the active rectifier connected to the filter circuit; and
the DC link supplied by the active rectifier.

14. The controller according to claim 12, comprising a computer program including instructions which, when being executed by the processor, cause the processor to carry out the method of claim 1.

15. A non-transitory computer-readable medium in which the computer program according to claim 14 is stored.

* * * * *